United States Patent [19]
Masuda

[11] Patent Number: 5,512,822
[45] Date of Patent: Apr. 30, 1996

[54] MAGNETIC SENSOR WITH MEMBER HAVING MAGNETIC CONTOUR ANTISOTROPY

[75] Inventor: Noboru Masuda, Kawaguchi, Japan

[73] Assignee: Murata Mfg. Co., Ltd., Nagaokakyo, Japan

[21] Appl. No.: 368,614

[22] Filed: Jan. 4, 1995

[30] Foreign Application Priority Data

Jan. 11, 1994 [JP] Japan ..................... 6-001343

[51] Int. Cl.⁶ ................ G01N 27/72; G01R 33/12; G07D 7/00; G06K 7/08
[52] U.S. Cl. .............. 324/235; 209/569; 235/449; 324/228; 324/252
[58] Field of Search ............ 324/207.2, 207.21, 324/207.24, 207.26, 228, 235, 243, 251, 252, 260, 261; 194/210, 213; 209/567, 569; 235/449; 360/112, 113; 340/825.34; 382/135

[56] References Cited

U.S. PATENT DOCUMENTS 4,518,919  5/1985  Ishida ................ 324/235 X
5,144,234  9/1992  Murata ............... 324/207.2 X

FOREIGN PATENT DOCUMENTS

0331135A3  9/1989  Germany .
59-009987  1/1984  Japan .
63-314413  12/1988  Japan .
6018278    1/1994  Japan .

*Primary Examiner*—Gerard R. Strecker
*Attorney, Agent, or Firm*—Dickstein, Shapiro & Morin

[57] ABSTRACT

A magnetic sensor includes a member having a magnetic contour anisotropy. A counterpart yoke is disposed above a magnet. The thickness of the counterpart yoke is equal to or slightly smaller than the resolution. The counterpart yoke has a magnetic contour anisotropy for restraining the divergence of the magnetic flux from the magnet. The resolution can be prevented from being reduced depending on the distance between a medium and a magnetic sensing element. At the same time, the magnet can be miniaturized.

20 Claims, 11 Drawing Sheets

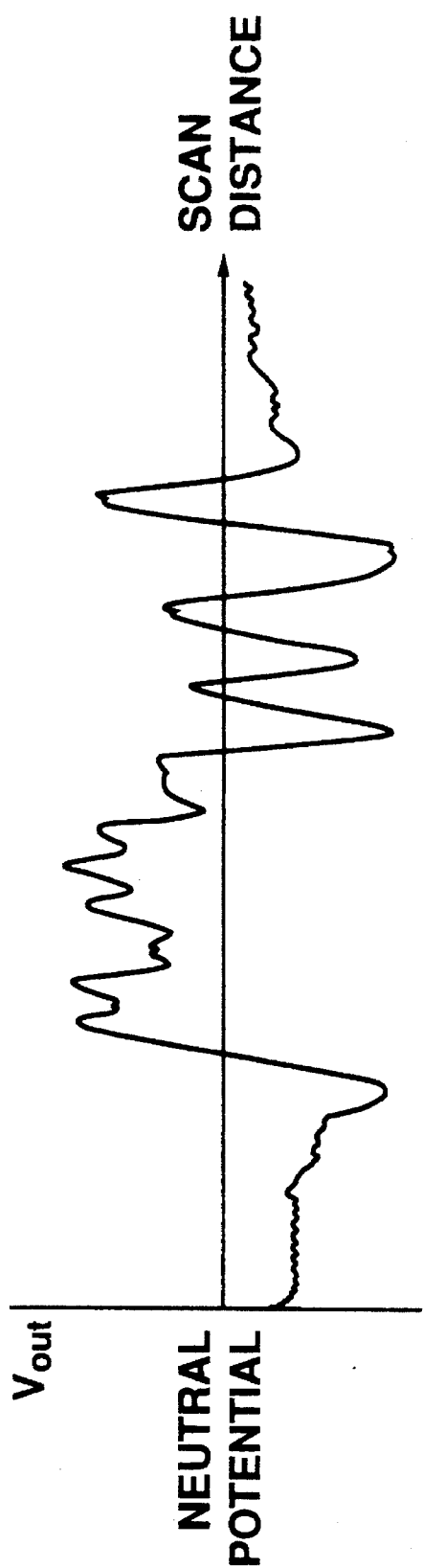
Fig. 9 PRIOR ART
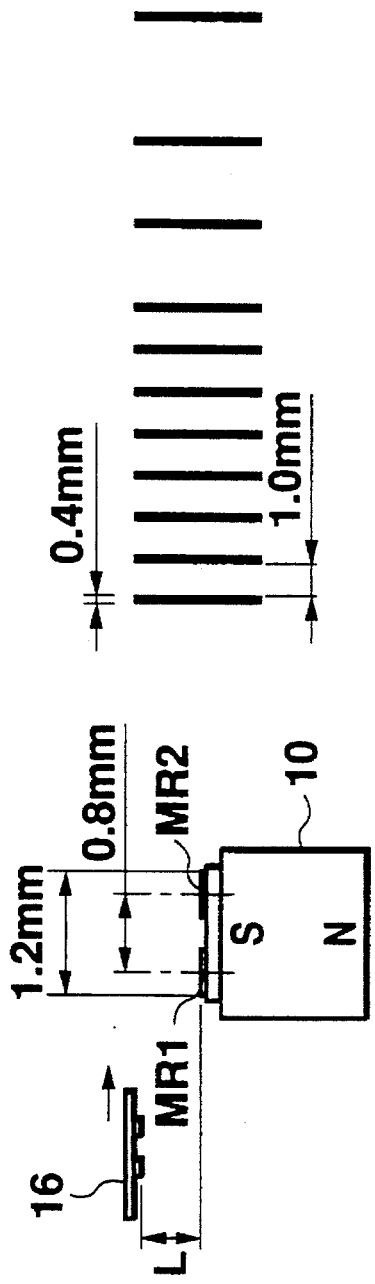
Fig. 8
Fig. 7

5,512,822

MAGNETIC SENSOR WITH MEMBER HAVING MAGNETIC CONTOUR ANTISOTROPY

BACKGROUND OF THE INVENTION a) Field of the Invention

The present invention relates to a magnetic sensor including a magnetic sensing element such as magnetoresistance element or the like and particularly to such a magnetic sensor suitable for use in the detection of minute magnetic patterns which are printed on paper bank notes or other paper-like media.

b) Description of the Prior Art

Magnetic sensors are known which use various types of magnetic sensing elements. One of these known magnetic sensing elements is a magnetoresistance element. The magnetoresistance element is one that has a variable electrical resistance depending on change of the magnetic flux density. For example, such a magnetoresistance element may be formed by a semiconductor having a relatively large mobility, such as Si, InSb, InAs, GaAs or the like. FIG. 1 shows the schematic arrangement of a magnetic sensor constructed in accordance with the prior art. The magnetic sensor of the prior art uses magnetic sensing elements in the form of a magnetoresistance element, the output of which is used to ascertain the authenticity of paper bank notes.

The magnetic sensor comprises two magnetoresistance elements MR1 and MR2, a magnet 10, a holder 12 and a casing 14. The magnetoresistance elements MR1 and MR2 are normally disposed on a substrate (not shown) and connected to each other to form such a circuit as shown in FIG. 2. The magnetoresistance elements MR1 and MR2 (and actually their substrate) are held by the holder 12 with the magnet 10, or are mounted on the magnet 10. The holder 12 includes a plurality of terminals not shown which are embedded therein. DC voltage is applied to the magnetoresistance elements MR1 and MR2 through these terminals. The output voltage of the magnetoresistance elements MR1 and MR2 is also taken out through the terminals. It is of course possible that the magnetoresistance elements MR1 and MR2 may be mounted on the magnet 10 directly or without the use of the substrate.

The magnetic sensor may be used to sense minute magnetic materials and the like which are formed on paper bank notes or other paper-like media. More particularly, when the magnetoresistance elements MR1 and MR2 are connected with their directions of anisotropy being opposite to each other with a DC voltage Vin being applied across these elements as shown in FIG. 2 and if a medium 16 having a magnetic pattern is moved across a space above the magnetoresistance elements MR1 and MR2, such a voltage Vout as shown in FIG. 3 will be outputted from the junction point between the magnetoresistance elements MR1 and MR2.

The voltage Vout is one that is variable about a neutral potential being a DC potential which is determined depending on the magnetoresistance elements MR1 and MR2. The voltage Vout varies depending on a change of the electrical resistance in the magnetoresistance elements MR1 and MR2. As the medium 16 including the magnetic materials on the surface thereof is moved above the magnetoresistance elements MR1 and MR2, the magnetic fluxes crossing the magnetoresistance elements MR1 and MR2 vary in density. As a result, the electrical resistance in the magnetoresistance elements MR1 and MR2 will also vary. Thus, the magnetic sensor can sense the medium 16 including the magnetic materials printed from a magnetic ink as in paper bank notes or the like through the changing Vout due to changes of the electrical resistance in the magnetoresistance elements MR1 and MR2. The magnet 10 serves as means for magnetically biasing the magnetoresistance elements MR1 and MR2 on detection of the magnetic pattern, thereby improving the magnetic sensor in detection sensitivity.

The resolution of the magnetic sensor depends on the pitch between the magnetoresistance elements MR1 and MR2 or the distance L between the magnetoresistance elements MR1, MR2 and the medium 16. If the flux in the magnet 10 is not divergent, the resolution is equal to the pitch between the magnetoresistance elements MR1 and MR2. However, the resolution is lower than the pitch between the magnetoresistance elements MR1 and MR2 since the flux of the magnet 10 is actually divergent.

The detection sensitivity of the magnetic sensor depends on the distance L between the magnetoresistance elements MR1, MR2 and the medium 16. More particularly, the detection sensitivity decreases as the distance L increases. Thus, the reliability on read-out will decrease if the distance L is not constant.

To maintain the resolution and detection sensitivity and to secure the reliability on read-out, the magnetic sensor requires means for maintaining the distance L between the magnetoresistance elements MR1, MR2 and the medium 16 constant. The casing 14 (and more particularly its upper air gap) provides such a means. More particularly, the distance L can be maintained substantially constant even when the medium 16 is moved along the top of the casing 14 since the top of the casing 14 is positioned to maintain the spacing between the casing top and the magnetoresistance elements MR1, MR2 constant. Since the medium 16 is in direct contact with the casing 14, but not with the magnetoresistance elements MR1 and MR2, any collision or friction will not be produced between the magnetoresistance elements MR1, MR2 and the medium 16 even if the speed of movement of the medium 16 is increased.

In such an arrangement of the prior art, however, it is difficult to improve the resolution of the magnetic sensor and to reduce the size of the same. First, the resolution is restrained by the distance L. Second, the entire magnetic sensor is increased in size since it is required to increase the size of the magnet so that it will be influenced by the divergence of the magnetic flux as little as possible. Finally, the resolution and/or detection sensitivity tend to be irregular.

SUMMARY OF THE INVENTION

The first object of the present invention is to provide a magnetic sensor having a resolution which does not depend to a large extent on the distance between the medium and the magnetoresistance elements. The second object of the present invention is to form a magnetic bias flux which approximates to a parallel or slightly convergent field. The third object of the present invention is to design the size of a magnet providing a bias flux in a freer manner. The fourth object of the present invention is to provide a magnetic sensor which is smaller in size. The fifth object of the present invention is to provide a magnetic sensor which does not tend very much to produce a dispersion in characteristics such as resolution, detection sensitivity and others. The sixth object of the present invention is to prevent a barrel field from being generated, thereby further improving the resolution.

The present invention provides a magnetic sensor comprising a magnetic sensing element for sensing a change in an applied magnetic flux, the magnetic sensing element being positioned adjacent to space (medium moving space) in which a magnetic paper-like medium is moved and also being positioned parallel to the direction of movement of the magnetic paper-like medium; a magnet disposed close to this space for applying a bias flux to the magnetic sensing element; and a magnetic piece disposed opposite to the magnet through the space, the said magnetic piece having a magnetic contour anisotropy for restraining the divergence of the bias flux in the space.

According to the present invention, the magnetic piece having a magnetic contour anisotropy is disposed close to the medium moving space in-which the magnetic paper-like medium is moved. The magnetic contour anisotropy is a configurational property of the magnetic member in which the demagnetizing field factor coefficient is variable depending on a ratio of a length along the direction of flux to an area in a section perpendicular to the direction of flux. The action purpose of the magnetic contour anisotropy of the magnetic piece in the present invention is to restrain the divergence of the bias flux in the space in which the magnetic paper-like medium is moved. Such an anisotropy may be provided by the fact that the ratio of an area A in a section perpendicular to the direction of bias flux to a length $l_B$ along the direction of bias flux ($A/l_B$) is relatively small. The anisotropy permits the magnetic flux to approach to a parallel or slightly divergent flux in the space at least adjacent to the magnetic sensing element.

The present invention can improve and suppress the variance of the resolution and detection sensitivity since they do not substantially depend on the distance between the magnetic sensing element and the magnetic paper-like medium. The entire system can be reduced in size since the magnet can be reduced in size.

The magnetic sensing element may be a magnetoresistance element whose electrical resistance varies depending on change of the applied magnetic flux. The magnetoresistance element may be disposed between the magnet and the medium moving space or between the magnetic piece and the medium moving space. In the latter case, the magnet can be located remote from the medium moving space, so that the magnetic sensing element will hardly be affected by the divergence of the bias flux. Also in the latter case, the freedom of design for the magnet can also be improved. By providing a member between the magnet and the medium moving space for forming such a medium moving space, the medium can move at a position closer to the magnetic piece than the magnet.

The magnetic piece must be so formed that at least a part of the magnetic piece provides a magnetic contour anisotropy. For example, the magnetic contour anisotropy can be accomplished by providing a magnetic leg portion in which the length along the direction of bias flux is larger than the area in the section perpendicular to the direction of bias flux. A low-reluctance portion may be disposed at a position opposite to the medium moving space about the magnetic leg portion to increase the concentration of the bias flux into the magnetic leg portion and also to improve the magnetic efficiency. In such a case, the reluctance at the junction between the magnetic leg portion and the low-reluctance portion will vary more gently if a sloping wall portion is provided for connecting the magnetic leg portion and the low-reluctance portion. A magnetic path for returning the bias flux to the magnet may be provided by shaping the magnetic piece into an E-shaped configuration or by mounting an auxiliary magnetic piece on the magnetic piece. Such a magnetic return path contributes to improvement of the magnetic efficiency. It is further preferred that the wall thickness of the section perpendicular to the direction of bias flux is equal to or slightly smaller than the required resolution at a portion of the magnetic piece at least adjacent to the medium moving space (e.g., magnetic leg portion).

A plurality of such magnetic sensing elements may be connected to each other to provide a neutral potential. In such a case, a plurality of such magnetic leg portions are also provided. The magnetic separation between the magnetic leg portions can be secured by forming a notch or by providing a non-magnetic material. It is preferred that a second notch or the like is formed in the magnetic piece to form a magnetic path in each of the magnetic leg portions.

When it is desired to read out a plurality of channels, a plurality of magnetic leg groups are provided for a plurality of magnetic patterns. These magnetic leg groups are magnetically separated from one another. In such a manner, a plurality of channels can be read out using only one sensor. This can provide a more compact structure than any structure using a plurality of sensors. In such a case, a plurality of magnetic sensing element groups are provided. It is further preferred that a plurality of magnets are provided or that a plurality of magnetic leg portions are provided to be disposed for a plurality of magnetic pattern arrays.

A holder for holding the magnetic sensing element, magnet and magnetic piece in a direct or indirect manner may be provided to form the medium moving space into a desired configuration and also to provide the desired interrelationship between the magnetic sensing element, magnet and magnetic piece. Furthermore, a piezo noise may be removed by providing means for preventing the medium from being brought into contact with the magnetic sensing element.

BRIEF DESCRIPTION OF THE DRAWINGS

FIG. 7 is a view illustrating an environment in measuring such characteristics as shown in FIGS. 9 and 10.

FIG. 8 is a view illustrating test portions used to measure the characteristics as shown in FIGS. 9 and 10.

FIG. 9 is a graph showing the characteristics of the magnetic sensor without any counterpart yoke.

DETAILED DESCRIPTION OF THE PREFERRED EMBODIMENT

Figure 1:
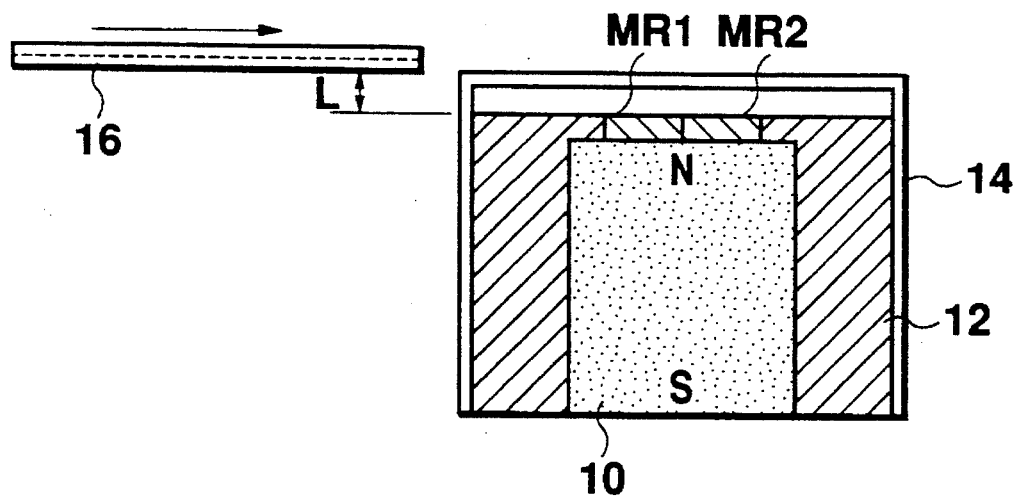
FIG. 1 is a cross-sectional view showing the schematic arrangement of a magnetic sensor constructed in accordance with the prior art.
Figure 2:
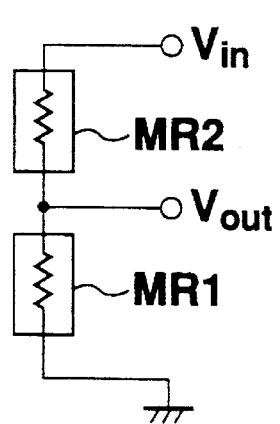
FIG. 2 is a circuit diagram of the prior art magnetic sensor shown in FIG. 1.
Figure 3:
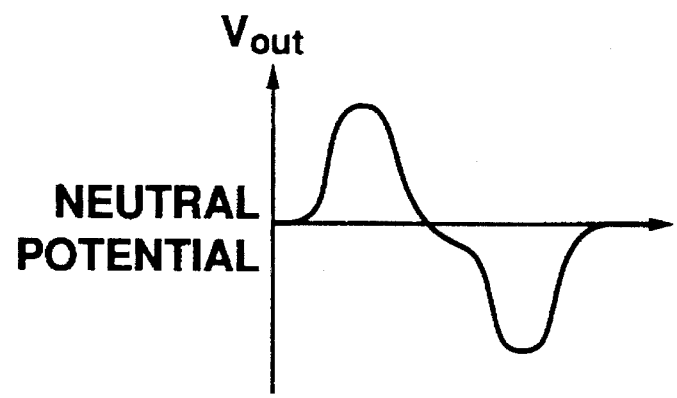
FIG. 3 is a graph showing the output waveform of the prior art magnetic sensor shown in FIG. 1.

The present invention will now be described by way of example with reference to the drawings throughout which parts similar to those of the prior art shown in FIGS. 1 to 3 are designated by similar reference numerals and will not further be described. Furthermore, parts common to all the preferred embodiments of the present invention are denoted by similar reference numerals and will not be repeatedly described.

a) First Embodiment

Figure 4:
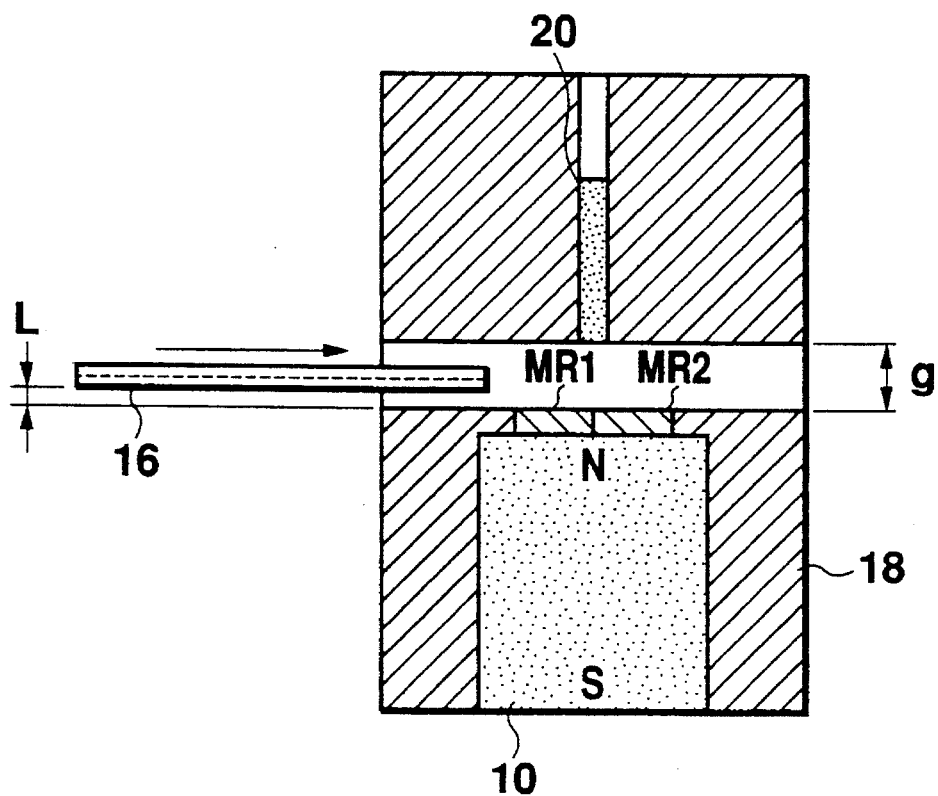
FIG. 4 is a cross-sectional view showing the schematic arrangement of a first embodiment of a magnetic sensor constructed in accordance with the present invention.
Figure 5:
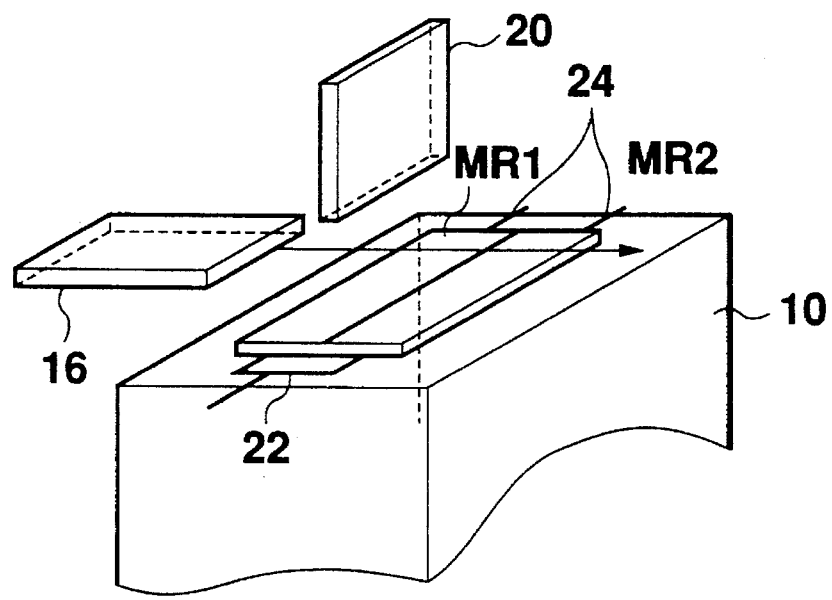
FIG. 5 is a perspective view of a magnetic circuit in the first embodiment.

FIG. 4 shows the schematic arrangement of a magnetic sensor according to the first embodiment of the present invention while FIG. 5 shows a magnetic circuit used in the first embodiment. The magnetic sensor comprises two magnetoresistance elements MR1 and MR2 which are connected to each other as shown in FIG. 2, a magnet 10 and a holder 18 for holding the magnetoresistance elements and magnet together.

The magnet 10 is preferably anisotropic, rather than isotropic. For example, the magnet 10 may preferably be formed of rare earth or strontium ferrite and have a magnetic flux density at its pole surface which ranges between about 0.2 and about 0.3 Teslas. Alternatively, the magnet 10 may be in the form of an electromagnet comprising a soft magnetic yoke and windings around the yoke, rather than a permanent magnet. With the electromagnet, the magnetic sensor can be used in much more applications since a bias flux can be produced by any type of electric current such as direct current or alternating current. When the bias flux is not required by the magnetic sensor under the unused or non-detecting state, the power supply to the magnetic sensor can be shut off to reduce the power consumption.

The magnetoresistance elements MR1 and MR2 are located on a substrate (not shown). The surfaces of the magnetoresistance element MR1 and MR2 are covered with a non-magnetic metal sheet (not shown) to prevent noise or the like from being produced when the magnetoresistance elements contact the medium 16. Reference numeral 22 denotes a wire connection between the magnetoresistance elements MR1 and MR2 while 24 designates wirings to a power source and ground. Since FIG. 5 is a view illustrating the magnetic circuit, the holder 18 and other mechanical components are omitted therein.

The first embodiment is characterized by that a flat plate-like counterpart yoke 20 is disposed above a space in which the medium 16 is moved. The counterpart yoke 20 is formed of a soft magnetic material of high permeability such as permalloy, pure iron, silicon steel or the like. The counterpart yoke 20 has one end face positioned at a singular point, that is, at a point in a plane perpendicular to the plane in which the magnetoresistance elements MR1 and MR2 are disposed and passing through a line substantially intermediate between the magnetoresistance elements MR1 and MR2. The counterpart yoke 20 is further arranged to have its longitudinal axis extending in the vertical direction as viewed in FIG. 4. To accomplish such an arrangement, the holder 18 holds the counterpart yoke 20 spaced away from the magnetoresistance elements MR1 and MR2 by an air gap g.

Figure 6:
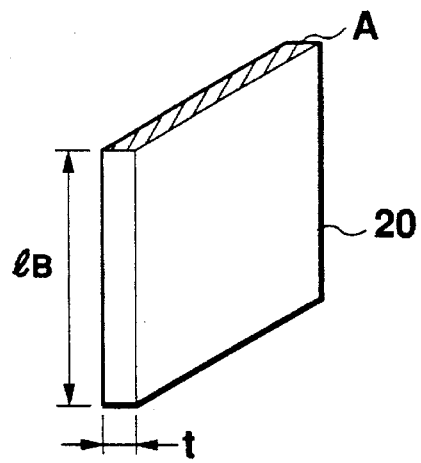
FIG. 6 is a perspective view of a counterpart yoke configuration in the first embodiment.

The primary function of the counterpart yoke 20 is to cause the magnetic flux of the magnet 10 to be a parallel or slightly convergent field in the air gap g. This improves the resolution of the magnetic sensor. In other words, the magnetic flux of the magnet 10 is restrained against divergence under the magnetic contour anisotropy of the counterpart yoke 20. To accomplish the magnetic contour anisotropy, the counterpart yoke 20 is formed to have such a configuration as elongated in the vertical direction and reduced in the horizontal direction (in cross-section) as viewed in FIG. 4, as described. Thus, the magnetic flux can slightly converge in the air gap g. When the magnetic sensor of the first embodiment is actually designed, the dimensions of the counterpart yoke 20 are determined depending on various factors such as saturation flux density, demagnetizing field factor and others. The saturation flux density depends on the type and shape of a magnetic material used in the counterpart yoke 20. As the saturation flux density increases, the convergence of the flux increases. The demagnetizing field factor depends on the shape of the counterpart yoke 20, more particularly, on the ratio $A/l_B$ (see FIG. 6). The thickness t of the counterpart yoke 20 is equal to or slightly smaller than the required resolution. This can provide a preferred resolution as required.

Figure 10:
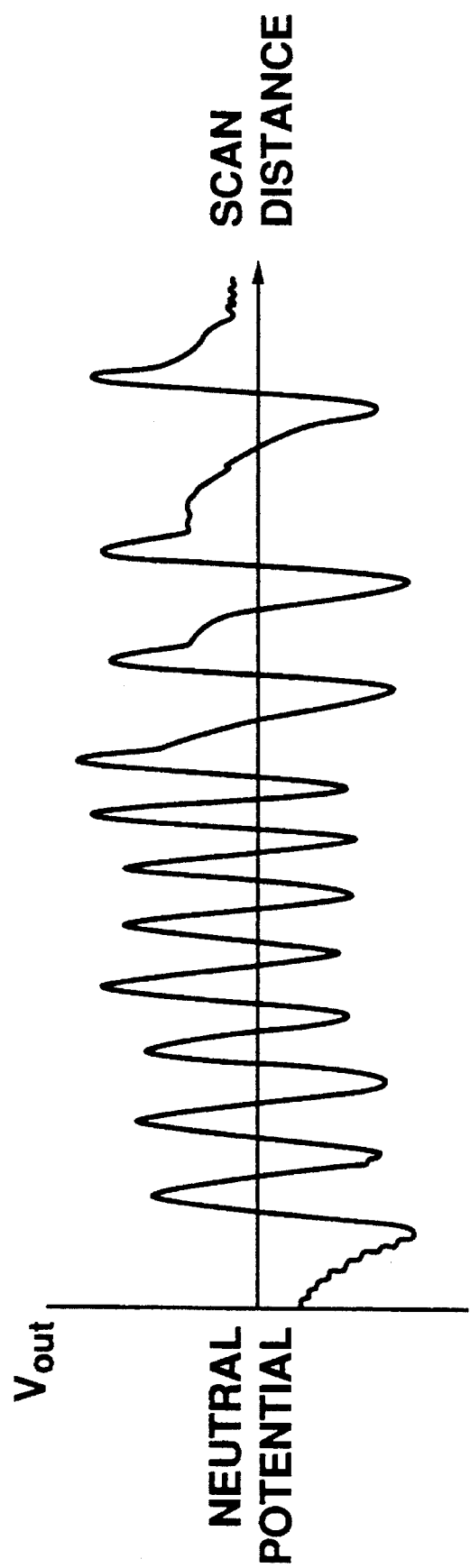
FIG. 10 is a graph showing the characteristics of the magnetic sensor with a counterpart yoke.

When a specimen of FIG. 8 (magnetic pattern pitch of 1.0 mm and magnetic pattern width of 0.4 mm) is read under the conditions of FIG. 7 (L=1.0 mm), the prior art provides such output waveform as shown in FIG. 9 while the first embodiment provides such output waveform as shown in FIG. 10 (in which the counterpart yoke 20 formed of pure iron has a thickness t equal to 0.5 mm and is disposed at the singular point). If the magnetic pattern pitch on the medium 16 is larger than the resolution of the magnetic sensor, such an output waveform as shown in FIG. 3 must be provided. With the prior art of FIG. 9, however, such a waveform can be provided only when portions having relatively large pitches (right-hand portion of FIG. 8) are read. However, the waveform of FIG. 10 provide the above waveform even when portions having relatively small pitches (left-hand portion of FIG. 8) are read. This fact shows that the first embodiment can provide an increased resolution.

The first embodiment can also increase the detection sensitivity by restraining the convergence of the magnetic flux. Thus, a circuit for amplifying the output voltage Vout can be manufactured more simply and inexpensively. Since the resolution and detection sensitivity of the magnetic sensor do not substantially depend on the distance L, the variation in characteristics can also be restrained. The magnet 10 may be of a reduced size to miniaturize the magnetic sensor.

The present invention is not limited to the first embodiment or the layout of magnetoresistance elements, or the shape and size of magnet and other components therein. Since to increase the resolution, it becomes difficult to position the counterpart yoke relative to the magnetoresistance elements, however, it is preferred to use a square-shaped magnet. In addition, the present invention is not limited to the magnetoresistance elements formed of Si, InSb, InAs or the like, but may similarly be applied to magnetoresistance elements in the form of a magnetic thin film which is formed of ferromagnetic material.

b) Second to Fourth Embodiments

Figure 11:
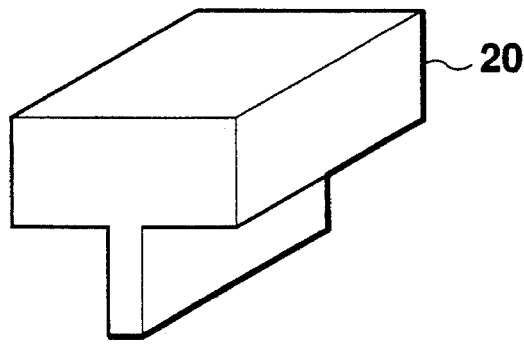
FIG. 11 is a perspective view of a counterpart yoke configuration in the second embodiment of a magnetic sensor constructed in accordance with the present invention.
Figure 12:
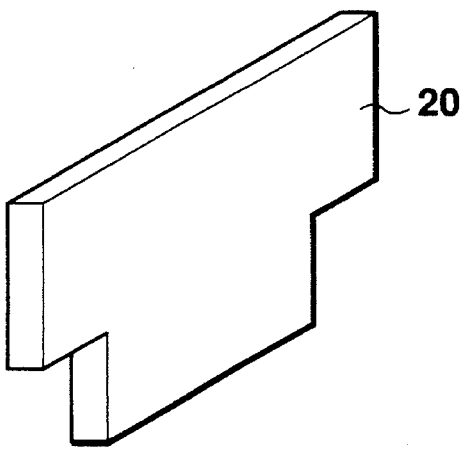
FIG. 12 is a perspective view of a counterpart yoke in the third embodiment of a magnetic sensor constructed in accordance with the present invention.
Figure 13:
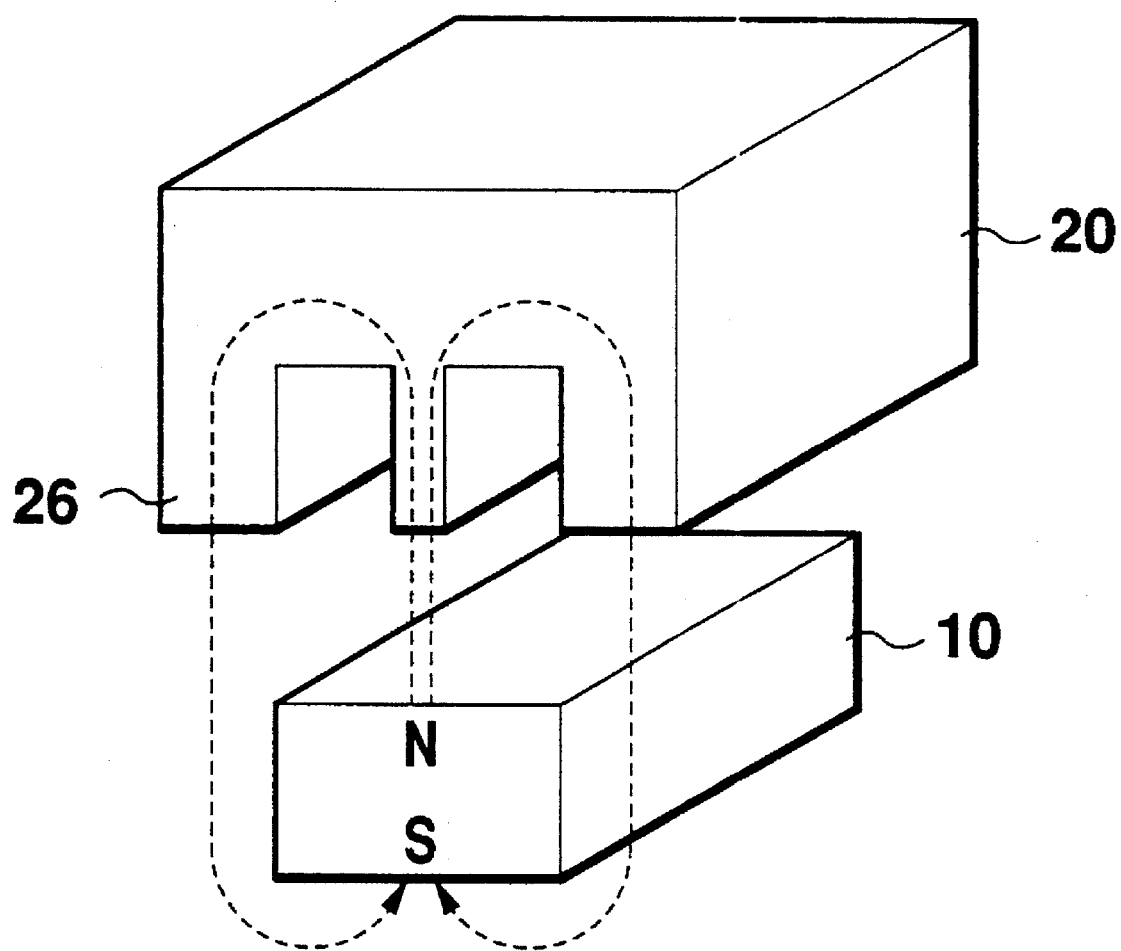
FIG. 13 is a perspective view of a counterpart yoke in the fourth embodiment of a magnetic sensor constructed in accordance with the present invention.

Since the present invention is to restrain the divergence of the magnetic flux in the medium moving space, it is sufficient for the counterpart yoke to have a magnetic contour anisotropy in order to accomplish such a restraint. Therefore, the configuration of the counterpart yoke may be slightly different from that of the first embodiment. FIGS. 11 to 13 respectively show the second to fourth embodiments and particularly the configurations of counterpart yokes used in these embodiments.

In the second embodiment, the counterpart yoke 20 has a thickened top configuration. Such a top configuration can reduce the reluctance at the top of the counterpart yoke 20. In the third embodiment, the top of the counterpart yoke 20 is increased in width. Thus, the reluctance at the top of the counterpart yoke 20 is similarly reduced. In the fourth embodiment, the counterpart yoke 20 is of E-shaped configuration, with two arms thereof functioning as a magnetic return path 26 for returning the bias flux to the magnet 10. In any event, the advantages similar to those of the first embodiment can be provided. In addition, the reduction of reluctance increases the magnetic efficiency and thus miniaturization of the magnet 10 is facilitated. The magnetic return path 26 in the fourth embodiment can improve the magnetic efficiency and thus miniaturize the magnet 10.

c) Fifth Embodiment

Figure 14:
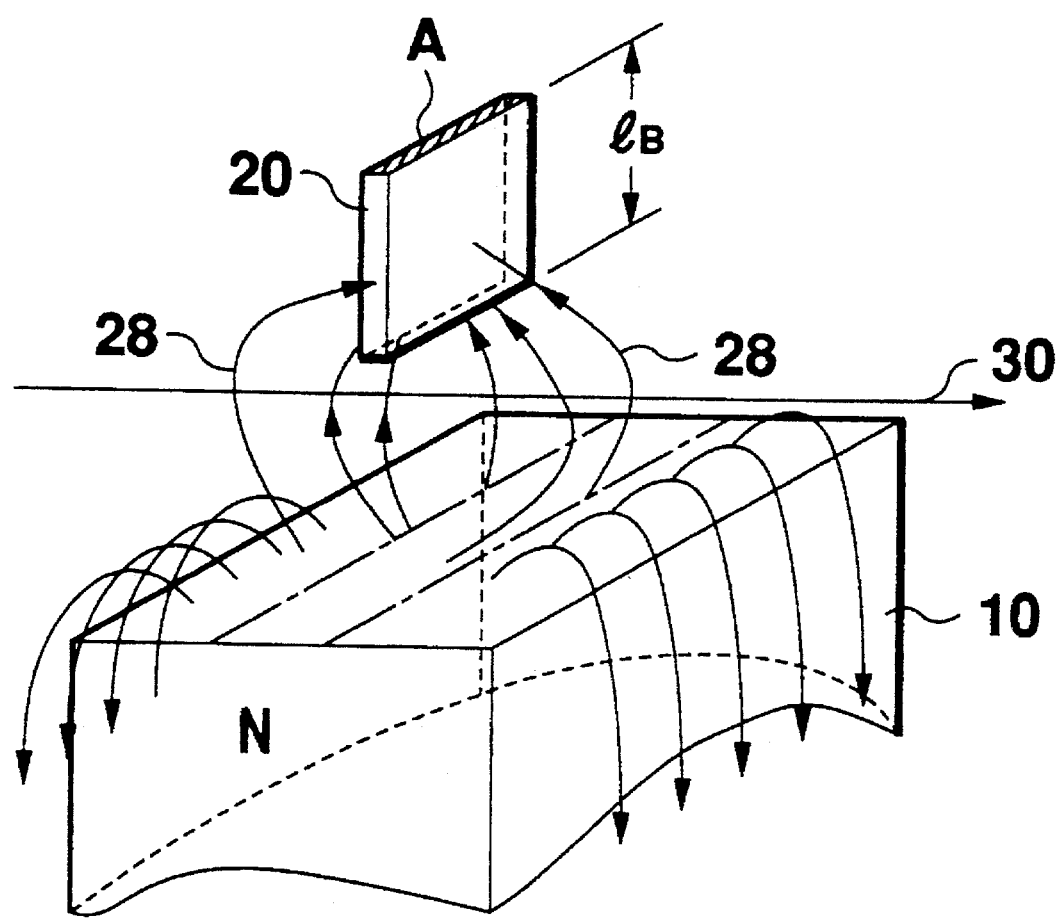
FIG. 14 is a schematic and perspective view illustrating a problem raised in the first embodiment.
Figure 15:
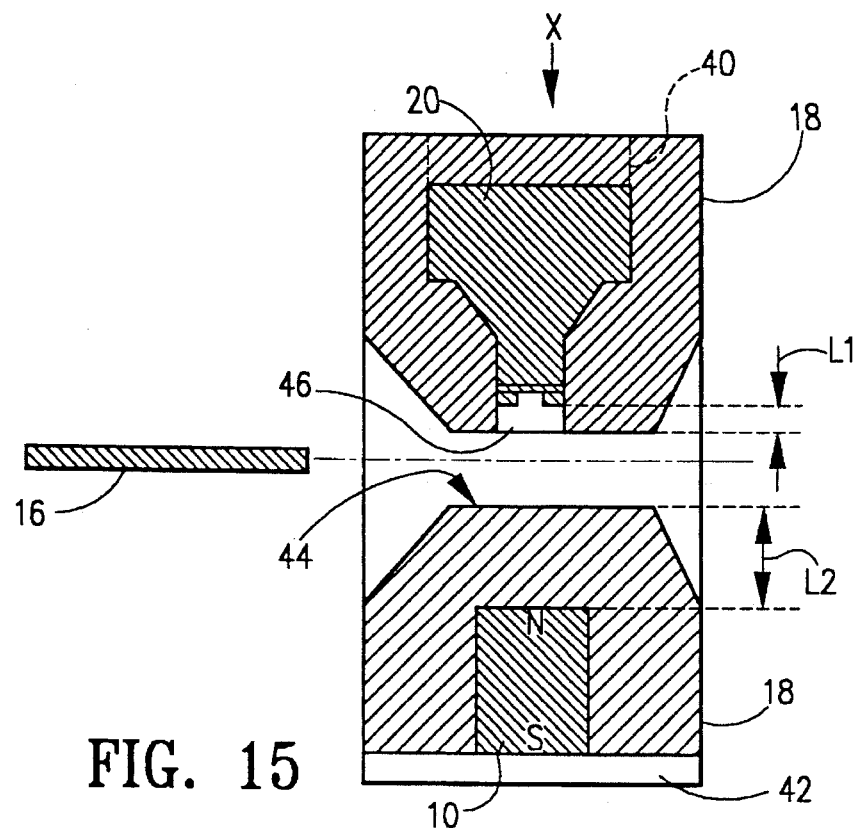
FIG. 15 is a cross-sectional view showing the schematic arrangement of the fifth embodiment of a magnetic sensor constructed in accordance with the present invention.

When such a flat plate-like counterpart yoke 20 as in the first embodiment is used, it raises a problem in that the resolution is prevented from being further improved because of the generation of a barrel magnetic field 28 from the magnet 10 to the side surfaces of the yoke 20, as shown in FIG. 14. In other words, the medium 16 will move through the barrel magnetic field 28 when the medium 16 moves in a direction shown by arrow 30 in FIG. 14. As a result, the resolution will be lower than when the parallel or slightly converging field is ideally produced. Such a problem may be overcome by applying the second embodiment. FIG. 15 shows the schematic arrangement of the fifth embodiment according to the present invention while FIG. 16 shows a magnetic circuit used in the fifth embodiment.

In the fifth embodiment, a counterpart yoke 20 comprises a magnetic leg portion 32, sloping wall portions 34 and a low-reluctance portion 36, all of which are formed of the aforementioned soft magnetic material into a single unit. The magnetic contour anisotropy is provided by the magnetic leg portion 32 which extends downward as viewed in FIG. 16. More particularly, the lower end face of the magnetic leg portion 32 has an area A set sufficiently small relative to the length $l_B$ of the magnetic leg portion 32 in the vertical direction as viewed in FIG. 16 for the reluctance to be sufficiently increased in a direction parallel to that lower end face (horizontal direction as viewed in FIG. 16). Thus, the bias flux (having a magnetic flux density $\Phi$ in FIG. 16) from the magnet 10 will concentrate into the lower end face of the magnetic leg portion 32.

Figure 16:
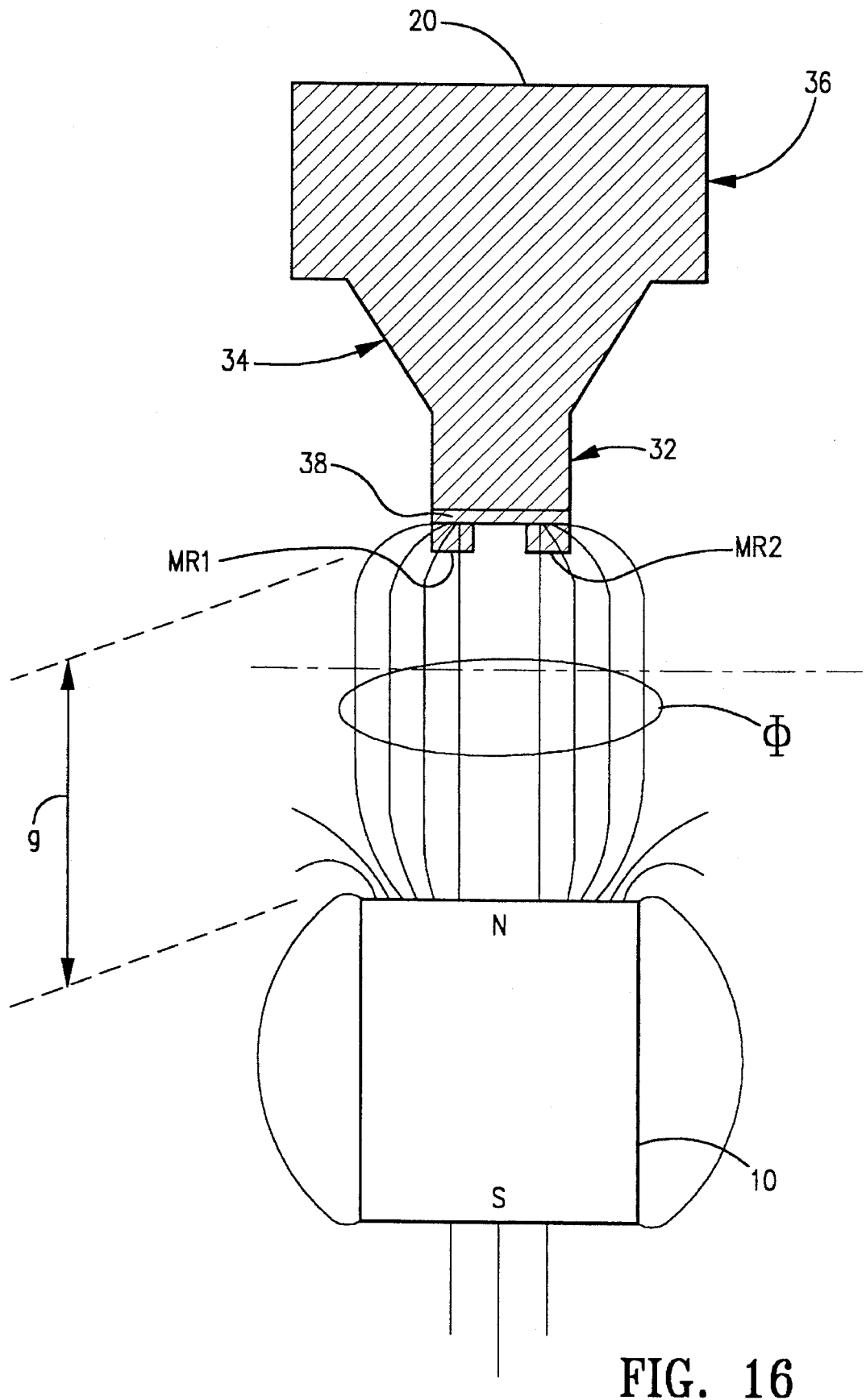
FIG. 16 is a cross-sectional view showing a magnetic circuit in the fifth embodiment.

The low-reluctance portion 36 is located above the magnetic leg portion 32 as viewed in FIG. 16. The low-reluctance portion 36 has a configuration larger in wall-thickness and width than the magnetic leg portion 32 such that the reluctance thereof will sufficiently be low in all directions. The sloping wall portion 34 connects between the magnetic leg portion 32 and the low-reluctance portion 36 with an angle such that the reluctance will progressively vary. Therefore, the reluctance of the sloping wall portion 34 is higher than that of the low-reluctance portion 36. The dimensions of the counterpart yoke 20 in the fifth embodiment may be as follows:

Width at the tip of the magnetic leg portion 32 (horizontal size as viewed in FIG. 15): 1.7 mm Width of the low-reluctance portion 36:4.8 mm Height of the low-reluctance portion 36 (vertical size as viewed in FIG. 15): 2.4 mm–4.8 mm Wall-thickness of the low-reluctance portion 36 (depth as viewed in FIG. 15): 4.5 mm The magnet and counterpart yoke 10, 20 are held by the holder 18 such that the lower end face of the magnetic leg portion 32 will be located opposite to one of the poles in the magnet 10 (N-pole in FIG. 15) through the air gap g. For such a purpose, the holder 18 includes an upper counterpart yoke receiving chamber and a lower magnet receiving chamber. Broken line 40 indicates the opening of the upper counterpart yoke receiving chamber. When the counterpart yoke 20 is to be assembled into the holder 18, the counterpart yoke 20 is inserted into the interior of the holder 18 through the opening 40 with the lower end face of the magnetic leg portion 32 being directed downward. Although the opening 40 is hatched in FIG. 15, this is because it is considered to be performed by an insert molding or posterior sealing. The air gap g is preferably equal to about 2 mm, but may be increased to about 5 mm. The opening at the lower end of the magnet receiving chamber is sealed by an auxiliary soft magnetic plate 42. The auxiliary magnetic plate 42 is in contact with one pole (S-pole in FIG. 15) in the magnet 10.

In the fifth embodiment, magnetoresistance elements MR1 and MR2 are arranged on the side of the counterpart yoke 20, rather than the side of the magnet 10. More particularly, the magnetoresistance elements MR1 and MR2 are mounted on a substrate 38 which is in turn fixedly mounted on the lower end face of the magnetic leg portion 32. The substrate 38 may be formed of ferrite or glass. The interrelationship between the magnetoresistance elements MR1 and MR2, the connection between the magnetoresistance elements MR1 and MR2 and the electrical circuit formed by the magnetoresistance elements MR1 and MR2 will be apparent from FIGS. 2 and 5.

The holder 18 may be molded or formed of any of resins, non-magnetic metals and any other suitable materials. When the holder 18 is to be molded, the magnet 10 may have previously been inserted (insert molding). The holder 18 may include leads for the magnetoresistance elements MR1 and MR2, an amplifying circuit for amplifying the output Vout and other components. The holder 18 provides a wall thickness portion 44 located between the magnet 10 and the path of medium movement for providing a physical gap having a width L2. On the other hand, an opening 46 is formed in the counterpart yoke receiving chamber at the bottom thereof and between the magnetoresistance elements MR1, MR2 and the path of medium movement and provides an air gap having a width L1. The opening 46 serves to prevent the medium 16 from being brought into contact with the magnetoresistance elements MR1 and MR2, so that a piezo noise can be prevented from being produced in the outputs of the magnetoresistance elements MR1 and MR2. Where the medium 16 is moved at a sufficiently low speed, the opening 46 can be omitted since the piezo noise is not tangible on collision or contact of the medium with the magnetoresistance elements MR1 and MR2. If the surface of the holder 18 is covered with a non-magnetic metal sheet such as tungsten or titanium, the air gap provided by the opening 46 may similarly be omitted since the non-magnetic metal sheet prevents the medium 16 from being brought into contact with the magnetoresistance elements MR1 and MR2.

In such an arrangement, the bias flux adjacent to the magnet 10 converges. However, the bias flux crossing the medium 16 approaches nearer to the parallel or slightly convergent field than the first embodiment by providing a relatively large gap L2 to separate the magnet 10 sufficiently from the path of movement of the medium 16 and also by forcing the medium 16 to move adjacent the magnetoresistance elements MR1 and MR2. Since the magnetoresistance elements MR1 and MR2 are located on the side of the counterpart yoke 20, they will not be affected by the divergence of the bias flux adjacent to the magnet 10. In addition, the bias flux will not substantially diverge adjacent to the magnetic leg portion 32 (and thus adjacent to the magnetoresistance elements MR1 and MR2) since the reluctance of the magnetic leg portion 32 in the vertical direction as viewed in FIG. 16 is extremely low due to the magnetic contour anisotropy and the bias flux is concentrated to the magnetic leg portion 32 from the bottom thereof by providing the low-reluctance portion 36. As a result, any damping or so-called back-signal will not appear at the front or back edge of the waveform of the voltage Vout through divergence of the bias flux. The quality of output can be thus improved while any reduction of detection sensitivity will not be produced.

The first embodiment requires one to increase the pole surface area of the magnet 10 sufficiently to improve the resolution since the latter will otherwise be affected by the barrel field. On the contrary, the fifth embodiment can allow freer design of the dimensions of the magnet 10 since the parallel or slightly convergent field can be produced irrespectively of the pole surface area in the magnet 10. The other settings such as strength and the like in the magnet 10 may be determined such that the magnetic flux density of the bias flux adjacent to the magnetoresistance elements MR1 and MR2 becomes sufficient to provide the desired properties such as detection sensitivity or the like. A theoretical relationship is established between the energy of the magnet 10 (the strength of the magnetic field to be produced), the surface area of the magnet 10 at the poles and the surface area of the counterpart yoke 20. Through such a relationship, thus, any suitable design may be applied to the strength of the magnet 10, the air gap g and others. Particularly where the magnetoresistance elements MR1 and MR2 are formed by semiconductors of InSb, InAs or the like, it is preferred that the strength of the magnet 10 and air gap g are so set that the magnetic flux density adjacent the magnetoresistance elements MR1 and MR2 becomes equal to or higher than 0.15 Teslas to maintain the detection sensitivity of the magnetoresistance elements at a higher level. This is because the electrical resistance in the magnetoresistance elements varies depending on the weak field according to a square-law characteristic and on the strong field according to a linear characteristic and therefore the detection sensitivity of the magnetoresistance elements will be relatively low when the magnetic flux density is lower than 0.15 Teslas, and will be constant when the magnetic flux density is higher than 1.5 Teslas.

d) Sixth Embodiment

Figure 17:
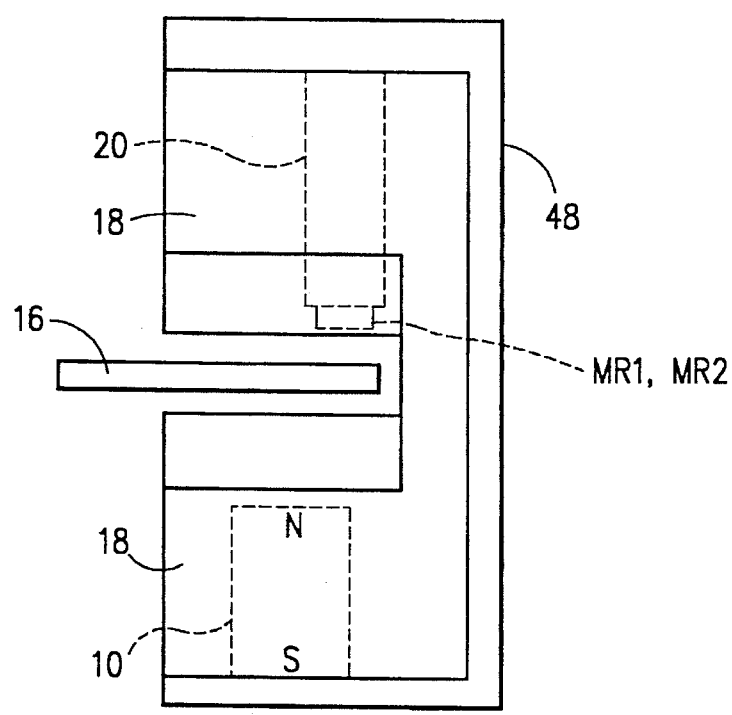
FIG. 17 is a side view showing the schematic arrangement of the sixth embodiment of a magnetic sensor constructed in accordance with the present invention.

FIG. 17 shows the schematic arrangement of a magnetic sensor according to the sixth embodiment of the present invention. This figure shows the right-hand side of the magnetic sensor as viewed in FIGS. 15 and 16. In the sixth embodiment, the magnetic sensor includes an auxiliary magnetic plate 48 formed of the same high-permeability magnetic material as in the counterpart yoke 20. The auxiliary magnetic plate 48 has one end in contact with a pole of the magnet 10, the other end thereof being in contact with the counterpart yoke 20. Such an auxiliary magnetic plate 48 can provide a magnetic return path of bias flux as in the fourth embodiment. This improves the magnetic efficiency to allow miniaturization of the magnet 10.

e) Seventh Embodiment

Figure 18:
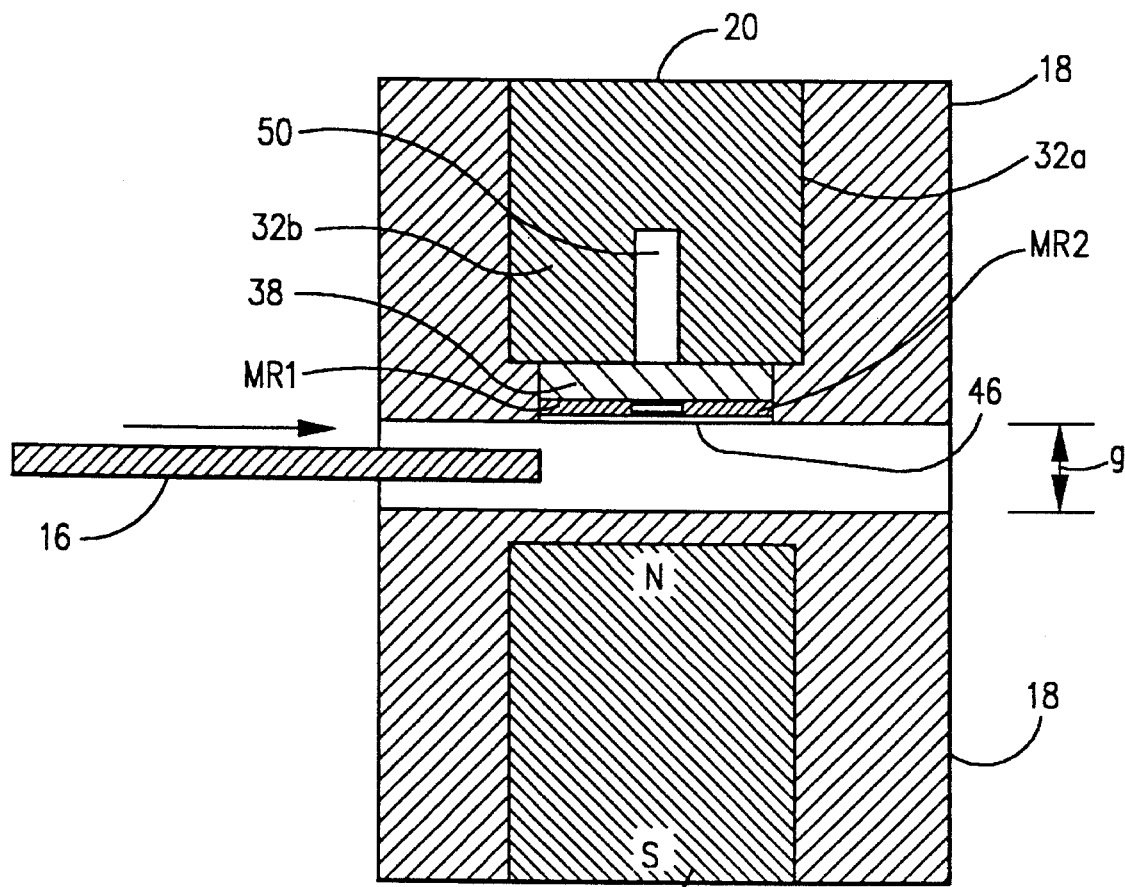
FIG. 18 is a cross-sectional view showing the schematic arrangement of the seventh embodiment of a magnetic sensor constructed in accordance with the present invention.

FIG. 18 shows the schematic arrangement of a magnetic sensor according to the seventh embodiment. In the seventh embodiment, the thick wall portion 44 above the magnet 10 is flat while the counterpart yoke 20 is of substantially rectangular cross-section. The bottom of the counterpart yoke 20 includes a notch 50 formed therein to extend in a direction perpendicular to the pole face of the magnet 10, the notch 50 having a width equal to about 0.2 mm. The notch 50 divides the lower part of the counterpart yoke 20 into two magnetic leg portions 32a and 32b. A substrate 38 on which magnetoresistance elements MR1 and MR2 are mounted is disposed such that it crosses the notch 50 or bridges between the magnetic leg portions 32a and 32b. Each of the magnetoresistance elements MR1 and MR2 is disposed so as to be positioned on the corresponding one of the magnetic leg portions 32a or 32b at the end thereof.

If the lower part of the counterpart yoke 20 is divided into two magnetic leg portions 32a and 32b by the notch 50 as in the seventh embodiment, a magnetic contour anisotropy similar to those of the fifth and sixth embodiments is produced in the magnetic leg portions 32a and 32b while the upper part of the counterpart yoke 20 with no notch functions as a low-reluctance portion. It can be said that the seventh embodiment provides a connection between the magnetic contour anisotropy portion and the low-reluctance portion without any sloping wall portion. Such an arrangement can improve the magnetic efficiency and resolution. The notch 50 also functions as means for separating the bias fluxes crossing the respective magnetoresistance elements from each other.

f) Eighth and Ninth Embodiments

Figure 19:
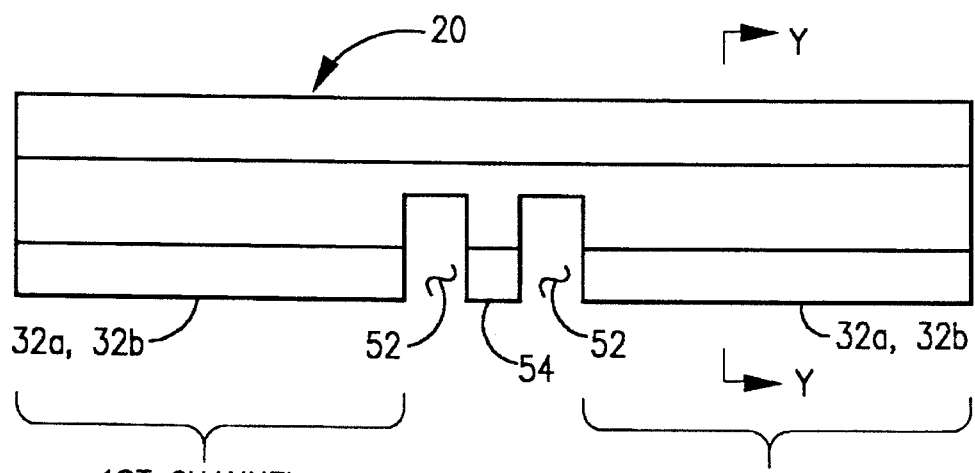
FIG. 19 is a side view showing the schematic arrangement of the eighth embodiment of a magnetic sensor constructed in accordance with the present invention.
Figure 20:
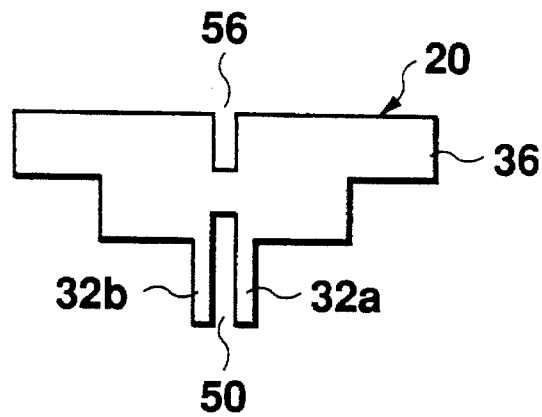
FIG. 20 is a cross-sectional view of the magnetic sensor according to the eighth embodiment of the present invention.

FIGS. 19 and 20 show the primary parts of a magnetic sensor according to the eighth embodiment of the present invention, particularly the arrangement of a counterpart yoke 20 used therein. FIG. 20 is a cross-sectional view taken along the line Y—Y of FIG. 19 while FIG. 19 is a side elevational view as viewed in a direction perpendicular to the reader's visual axis in FIG. 20.

In the eighth embodiment, two magnetic leg portions 32a and 32b of magnetic contour anisotropy are divided by cut grooves 52 into two sections. These sections correspond to two reading channels, as shown by "1st channel" and "2nd channel" respectively in FIG. 19. The reading channels indicate two arrays of magnetic pattern on the medium 16. Each of the sections may have a width equal to about 4.5 mm (in the horizontal direction as viewed in FIG. 19). The number of the reading channels is not limited to two. Thus, the present invention is also not limited to two channels. A plurality of magnetoresistance elements and the circuits relating thereto may be provided corresponding to the number of reading channels used therein. This will be apparent for a person skilled in the art from reading the disclosure.

The cut grooves 52 are separated from each other by an auxiliary magnetic leg portion 54 which functions as means for magnetically blocking between the channels of the magnetic leg portions 32a and 32b to reduce or eliminate cross-talk signal between the channels. The auxiliary magnetic leg portion 54 may have a thickness equal to about 1 mm if the width of each of the channels is equal to 4.5 mm. The low-reluctance portion 36 also includes a central notch 56 formed therein opposite to the notch 50. The notch 56 functions as means for separating the magnetic paths corresponding to the magnetoresistance elements from each other. In such an arrangement, a plurality of channels can be read while maintaining the advantages as in the previously described embodiments. It is of course possible that the previously described embodiments can similarly read a plurality of channels by providing a plurality of counterpart yokes 20 for the number of reading channels. However, the eighth embodiment can further facilitate miniaturization of the magnetic sensor with fewer parts.

Figure 21:
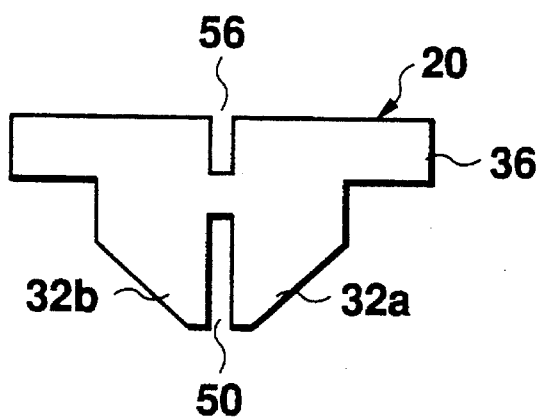
FIG. 21 is a cross-sectional view showing the schematic arrangement of the ninth embodiment of a magnetic sensor constructed in accordance with the present invention.

FIG. 21 shows the primary parts of a magnetic sensor according to the ninth embodiment of the present invention, particularly a counterpart yoke 20 used therein. FIG. 21 is a view of the counterpart yoke 20 in the same direction as viewed in FIG. 20. The ninth embodiment has the same side configuration as in the eighth embodiment and thus a figure corresponding to FIG. 19 is omitted. Unlike the eighth embodiment, magnetic leg portions 32a and 32b diverge upward as viewed in FIG. 21. Such an arrangement can also accomplish the reading of plural channels while maintaining the same advantages as in the previously described embodiments. However, the magnetic contour anisotropy in the ninth embodiment is inferior to that of the eighth embodiment.

Figure 22:
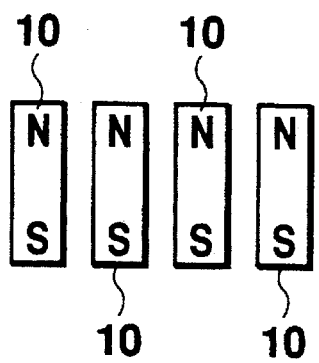
FIG. 22 is a cross-sectional view of the primary parts of the eighth or ninth embodiment, showing the structure and arrangement of magnets usable therein.
Figure 23:
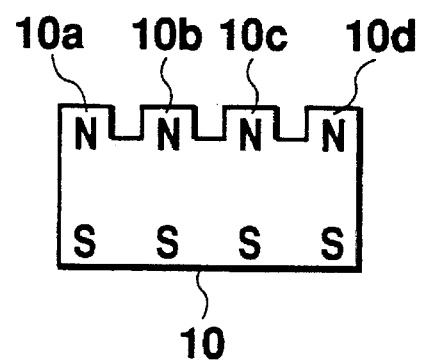
FIG. 23 is a cross-sectional view of the primary parts of the eighth or ninth embodiment, showing the structure and arrangement of a single magnet usable therein.

FIG. 22 shows the configuration and arrangement of a magnet 10 usable in the eighth and ninth embodiments of the present invention. FIG. 23 shows the configuration and arrangement of another magnet 10 usable in the eighth and ninth embodiments of the present invention. As shown in these figures, the multi-channel reading may preferably be accomplished by providing a plurality of magnets 10 for the number of channels (FIG. 22), by dividing one pole of the magnet 10 on the side of the medium 16 (N-pole in FIG. 23) into a plurality of magnetic legs (10a to 10d in FIG. 23) or by taking a combination of the arrangements shown in FIGS. 22 and 23. If the arrangement of FIG. 22 is to be taken, the polarities of the magnets 10 should coincide with one another.

I claim:

1. A magnetic sensor comprising:

a magnetic sensing element for sensing a change in an applied magnetic flux, said magnetic sensing element being positioned adjacent to a space in which a magnetic paper-like medium is moved and also being positioned parallel to a direction of movement of the magnetic paper-like medium, said change in applied magnetic flux being caused by the movement of the magnetic paper-like medium;

a magnet disposed close to said space for applying a bias flux to said magnetic sensing element; and a magnetic piece disposed opposite to said magnet through said space, said magnetic piece having a magnetic contour anisotropy for restraining a divergence of the bias flux in said space.

2. A magnetic sensor as defined in claim 1 wherein said magnetic sensing element is a magnetoresistance element having a resistance which is variable depending on the change in the applied magnetic flux.

3. A magnetic sensor as defined in claim 1 wherein said magnetic sensing element is disposed between said magnet and said space.

4. A magnetic sensor as defined in claim 1 wherein said magnetic sensing element is disposed between said magnetic piece and said space.

5. A magnetic sensor as defined in claim 4, further comprising a member for forming said space, said member being disposed between said magnet and said space such that said magnetic paper-like medium moves closer to said magnetic piece than said magnet.

6. A magnetic sensor as defined in claim 1 wherein said magnetic piece includes a magnetic leg portion having a magnetic contour anisotropy.

7. A magnetic sensor as defined in claim 6 wherein said magnetic piece further includes a low-reluctance portion of smaller reluctance disposed opposite to said space as viewed from said magnetic leg portion.

8. A magnetic sensor as defined in claim 7 wherein said magnetic piece further includes a sloping wall portion connecting between said magnetic leg portion and said low-reluctance portion such that a reluctance at the junction between said magnetic leg portion and said low-reluctance portion will vary gently.

9. A magnetic sensor as defined in claim 6 wherein said magnetic leg portion is of such a configuration that a cross-sectional area thereof perpendicular to a direction of bias flux is smaller than a length thereof in said direction of bias flux.

10. A magnetic sensor as defined in claim 7 wherein said low-reluctance portion is of such a configuration that a cross-sectional area thereof perpendicular to a direction of bias flux is larger than said magnetic leg portion.

11. A magnetic sensor as defined in claim 1 wherein the thickness of said magnetic piece in a section perpendicular to a direction of bias flux is equal to a required resolution at least at a portion of said magnetic piece adjacent said space.

12. A magnetic sensor as defined in claim 1 wherein the thickness of said magnetic piece in a section perpendicular to a direction of bias flux is smaller than the required resolution at least at a portion of said magnetic piece adjacent said space.

13. A magnetic sensor as defined in claim 1 wherein said magnetic piece includes a return circuit providing a magnetic path for returning the bias flux toward the magnet.

14. A magnetic sensor as defined in claim 1, further comprising a plurality of said magnetic sensing elements and wherein said magnetic piece includes a plurality of magnetic leg portions magnetically separated from one another by a notch or a non-magnetic material for at least one of the plurality of magnetic sensing elements, each of said magnetic leg portions having a magnetic contour anisotropy for restraining the divergence of the bias flux relative to the corresponding one of said plurality of magnetic sensing elements.

15. A magnetic sensor as defined in claim 14 wherein said magnetic piece forms a magnetic path for each of said magnetic leg portions.

16. A magnetic sensor as defined in claim 1 wherein said magnetic paper-like medium has a plurality of magnetic pattern arrays arranged in a direction perpendicular to a medium moving direction and wherein said plurality of magnetic piece includes a plurality of magnetic leg groups each for one of said plurality of magnetic pattern arrays; and means for magnetically separating said magnetic leg groups from one another.

17. A magnetic sensor as defined in claim 16, further comprising a plurality of said magnets one for each of said plurality of magnetic pattern arrays.

18. A magnetic sensor as defined in claim 16 wherein said magnet includes a plurality of magnetic leg portions, one disposed for each of said plurality of magnetic pattern arrays.

19. A magnetic sensor as defined in claim 1, further comprising a holder for directly or indirectly holding said magnetoresistance element, magnet and magnetic piece such that said space is formed and the positional interrelationship between said magnetoresistance element, magnet and magnetic piece is maintained.

20. A magnetic sensor as defined in claim 1, further comprising means for preventing said magnetic paper-like medium from being brought into contact with said magnetic sensing element.

* * * * *